Dec. 28, 1943.   G. G. STERN   2,337,690
DEPTH GAUGE
Filed Nov. 4, 1941
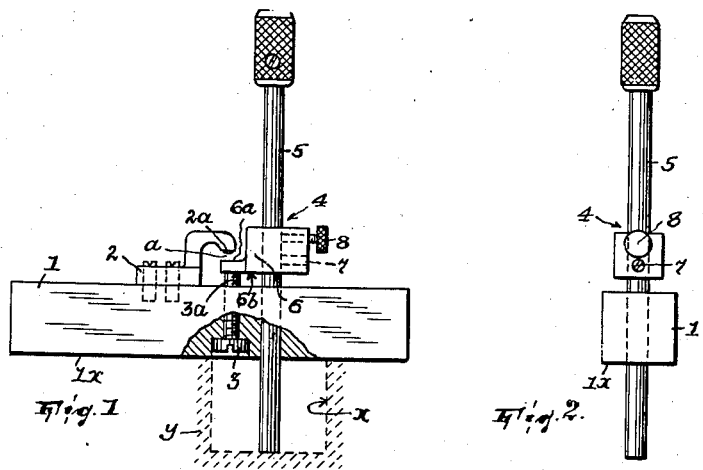
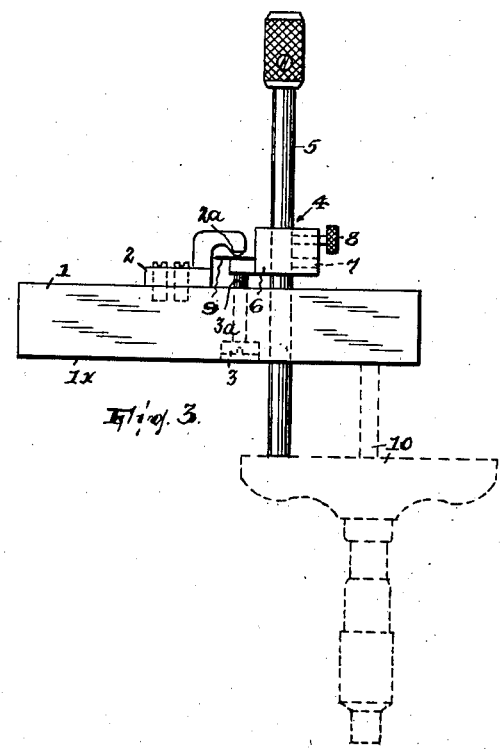
INVENTOR,
George G. Stern,
BY
John Steward,
ATTORNEY.

Patented Dec. 28, 1943

2,337,690

UNITED STATES PATENT OFFICE 2,337,690

DEPTH GAUGE

George G. Stern, Paterson, N. J.

Application November 4, 1941, Serial No. 417,746

2 Claims. (Cl. 33—169)

This invention relates to depth-gauges, that is to say, implements by which the depth of a hole, bore or other depression is to be ascertained, and its object is to provide a quite simple and reliable implement whereby depth, with tolerance, may be precisely determined.

In the drawing,

Fig. 1 is a side elevation of the improved depth-gauge;

Fig. 2 is an end elevation thereof; and

Fig. 3 shows the manner in which the implement is adjusted for gauging depth with tolerance.

Describing the example shown:

1 is a bar forming a base member or level whose bottom side or base 1x (here a continuous planiform surface) forms what I term its work-engaging base. It has a pair of vertically disposed abutments providing limit stops, one of which abutments is formed by the part 2 fixed to the upper side of the base member or level and having its free end bent off to reach lengthwise of the base member and stand spaced from said upper side, thus providing at 2a one limit stop, and the other of which abutments is a vertical screw 3 tapped into said base member from below and adjustable therein by turning it, its upper end providing the other limit stop at 3a.

The character 4 generally denotes a gauge member here comprising the following parts: slide or gauge rod 5, perpendicular to the work-engaging base 1x of the base member or level and slidable vertically and rotatable in the base member; an arm 6 mounted on the rod and movable lengthwise of and on and rotative to different radial positions about the rod, said arm being enterable between the limit stops 2a—3a when it undergoes rotation around the axis of the rod; and means to secure said arm to the rod in any position to which it is adjusted thereon, as a screw 8 tapped into the arm and adapted to abut the rod.

By releasing the set-screws the arm may be adjusted on and lengthwise of the slide, but for the meanwhile consider member 4 as being guided by member 1 for movement perpendicularly to the base 1x of the base and as having said arm normally confined thereto against displacement lengthwise of said path. In the sense that the member 4 is here rotative in the level the arm is rotative, to wit, around an axis perpendicular to the base.

The implement may be used as follows:

Say the operator wishes to determine if a hole or other depression x formed in a part, as y, has been developed deep enough. With the lower end of member 4 depending from the base 1x a distance equal to the depth the depression should at least have said member exists with the top surface 6a of its arm 6 in a plane parallel to the base and spaced from it a distance at least not greater than from the base to the plane (parallel with the base) of the limit stop 2a. If the depression is deep enough, then when the member 1 is seated on said part as shown and the member 4 is seated on the bottom of the depression member 4 may turn to pass its arm under the upper abutment—or without being arrested by the abutment, as would be the case if the depression lacked adequate depth.

Or say it is wished to determine if the depression is too deep. With the lower end of member 4 depending from the base a distance equal to the depth the depression should at most have said member exists with the bottom surface 6b of its arm 6 in a plane parallel to and spaced from the base at most not less than the distance from the base to the plane (parallel with the base) of the limit stop 3a. If the depression is not of excessive depth, then when the member 1 is seated on said part and member 4 is seated on the bottom of the depression member 4 may turn to pass its arm over the lower abutment—or without being arrested by said abutment, as would be the case if the depression exceeded the required depth.

Of course, with both abutments present and spaced a distance equal, or slightly more than equal, to the vertical thickness of the end of arm 6 it is possible to determine whether the depression is either not deep enough or too deep.

In describing uses of the implement as above adjustability of the arm lengthwise of the slide has been disregarded. If that condition exists, as shown and described, then it is possible to set the implement, to wit, by adjusting the arm lengthwise of the slide, for gauging the depth of any depression, as for insufficiency or over-depth, or both.

However, my ultimate object is to provide for gauging the depth of a depression with tolerance, which may be on the insufficient or over-depth side, as the case may be, and this indicates the reason for the screw 3 affording the limit stop 3a. Suppose the ideal depth is to be 2 inches, but a given tolerance is allowed—say $2/1000$ of an inch. Arm 6 of the gauge member 4 is first clamped between the abutments by screwing in screw 3. The set-screws 7—8 are then made to free arm 6 from the slide whereupon, with the aid of some suitable gauge such as a micrometer depth gauge 10 as shown in Fig. 3, the slide is adjusted relatively to arm 6 so as to project below the base 1x the ideal depth indicated, say exactly 2 inches, and the set-screws again made to secure the arm to the slide. This being done, the screw 3 may be unscrewed to admit a thickness blade 9 having the thickness for the required tolerance which is introduced between arm 6 and one of the abutments. For instance, suppose the tolerance is to be on the overdepth side: having clamped the arm 6 between 2a and 3a the slide is adjusted so as to depend below the base 1x a distance equal to the ideal depth, as 2 inches, whereupon the arm and a thickness blade of the required thickness, $2/1000$ of an inch, is clamped between 2a and 3a and then the blade is removed. Again, suppose the tolerance is to be on the insufficient or shallow side: the arm is clamped by 2a and 3a, as before, whereupon the slide is adjusted to depend below base 1x the ideal depth, as 2 inches, minus the specified tolerance, as $2/1000$ of an inch, and then a blade having thickness equal to such tolerance is clamped with the arm between 2a and 3a and the blade removed. Of course, the blade and arm could be first clamped between 2a and 3a and, while they remain so clamped, slide 5 adjusted relatively to the arm with reference to the micrometer gauge, that is, to the ideal depth, whereupon the blade would be removed.

In the example the arm is a part of member 4 and each abutment is on member 1, but it is obvious that their positions might be reversed as hereinbefore indicated.

Having thus fully described my invention, what I claim is:

1. A gauge including a base member having a work-engaging base, a rod perpendicular to said base and rotative and slidable lengthwise of itself in the base member, said base member having a pair of superposed abutments spaced from said rod and providing spaced superposed limit stops, an arm movable lengthwise of and on, and rotative to different radial positions about the axis of, the rod and on rotation about such axis being enterable between said limit stops, and means to secure said arm to the rod in any position to which the arm is adjustable on the rod.

2. A gauge in accordance with claim 1, wherein the arm is penetrated by the rod, wherein one of the limit stops consists of a screw threaded through the base member from beneath same, and wherein there is means threaded through the arm and engageable with the rod to adjustably hold the arm on the rod.

GEORGE G. STERN.